UNITED STATES PATENT OFFICE.

CHARLES N. WAITE, OF MEDFORD, MASSACHUSETTS, ASSIGNOR TO THE AVERY LACTATE COMPANY, OF PORTSMOUTH, NEW HAMPSHIRE.

MORDANT.

SPECIFICATION forming part of Letters Patent No. 290,294, dated December 18, 1883.

Application filed September 3, 1883. (No specimens.)

*To all whom it may concern:*

Be it known that I, CHARLES N. WAITE, of Medford, in the county of Middlesex, and in the State of Massachusetts, have invented certain new and useful Improvements in Mordants; and I do hereby declare that the following is a full, clear, and exact description thereof.

My invention relates to the production of a mordant suitable for dyers' use in the fixing of colors in fabrics woven of animal or vegetable fiber, and particularly adapted to wool, hair, and silk fibers, and also to be used in the dyeing of feathers, &c., all as will be more fully set forth hereinafter.

Heretofore tartaric and citric acids and their neutral and acid salts have been largely employed as mordants for dyers' use, and as a substitute for these it has been proposed to use lactic acid; but the action of this acid has been too feeble, and it did not sufficiently open the pores of the fibers to permit the dye to penetrate, and hence was comparatively valueless, unless used in large quantities, and it then became too expensive for general use, besides requiring too great a length of time for its action to be profitably employed. Other acids have been experimented with and used to some extent—such as oxalic and other very strong acids—but the great objection to their use lay in the fact that their action was much too powerful, and these acids have greatly injured and even destroyed the fibers subjected to their influence, and hence dyers have generally fallen back upon tartaric acid, either alone or in combination with potash, (in the form of cream of tartar,) as the most valuable and effective mordant for ordinary use.

My mordant is composed of a mixture of lactic acid and oxalic acid, used either alone or conjointly with some suitable metallic salt—such as the salts of tin, iron, alumina, antimony, &c.—in the proportion of four parts of the lactic acid to one part of the oxalic acid. These acids are thoroughly mixed together, and then the feeble action of the former is quickened by the latter, while the heretofore violent action of the latter is correspondingly moderated by the former.

As stated, my mordant is intended chiefly for use in connection with the fixing of colors to animal fibers, and it effectually opens the pores thereof quickly, thoroughly, and without the least injury thereto, although it may be advantageously employed with fabrics composed wholly or in part of vegetable fiber, or wherever a comparatively weak acid is essential to the successful fixing of the coloring-matter.

The special advantages of my mordant composed of the mixed acids (and its combinations) over the tartaric-acid mordant consist, first, in its greater cheapness; secondly, its superior fastness to soaps; and, thirdly, in the increased bloom and softness which it gives to the dyed fiber.

Having thus described my invention, what I claim as my invention, and desire to secure by Letters Patent, is—

As a mordant for dyers' use, a mixture consisting of four parts of lactic acid with one part of oxalic acid, substantially as set forth.

In testimony that I claim the foregoing I have hereunto set my hand, at Boston, in the county of Suffolk and State of Massachusetts, in the presence of two witnesses.

CHARLES N. WAITE.

Witnesses:
  H. G. UNDERWOOD,
  C. F. BROWN.